(No Model.)
W. H. POWER.
DEVICE FOR PREVENTING WATER IN PIPES OR TANKS FROM FREEZING.
No. 580,800. Patented Apr. 13, 1897.
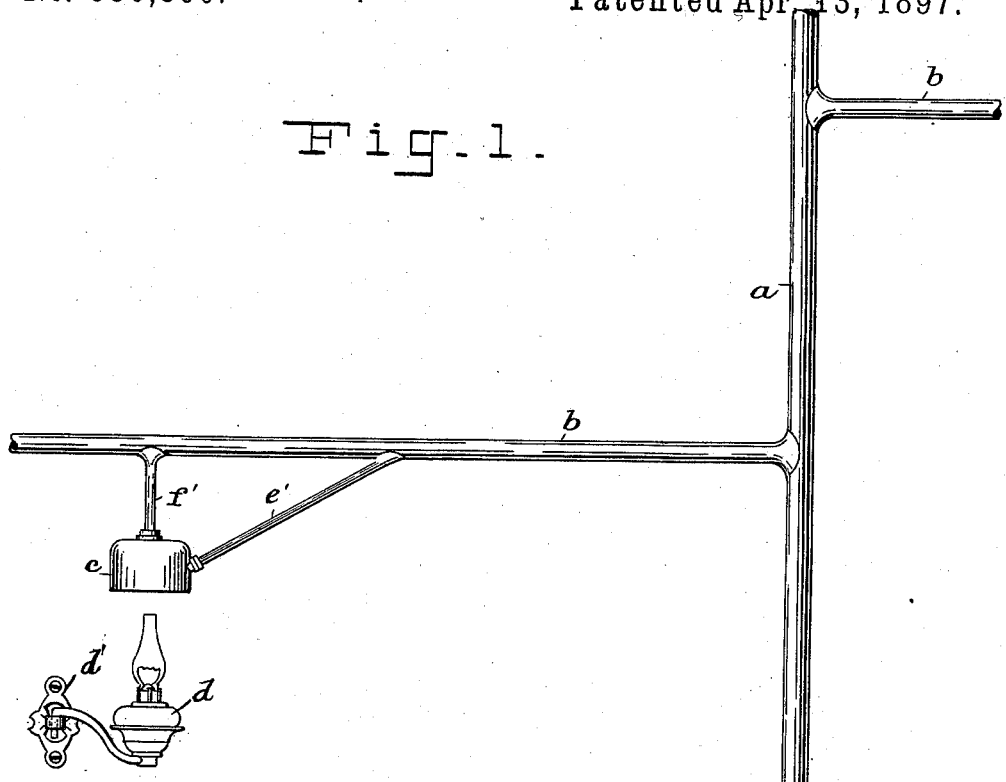
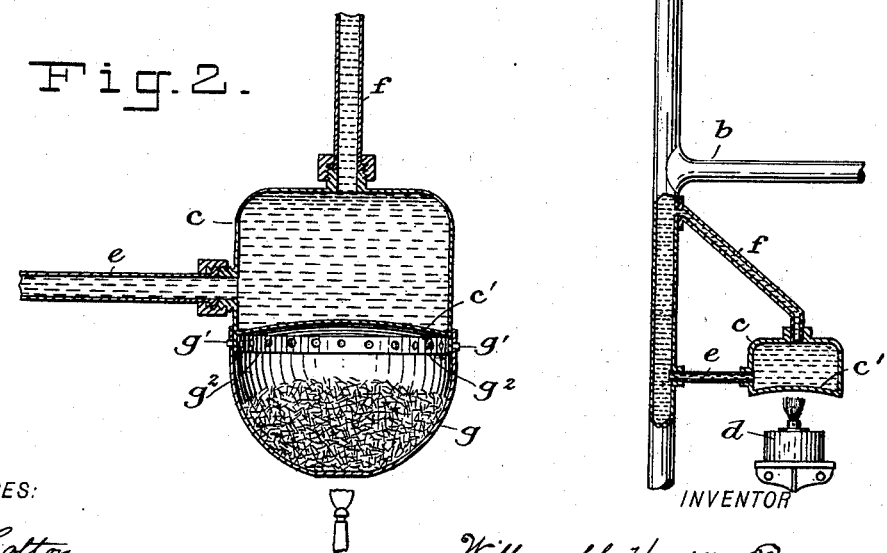
WITNESSES:
E. B. Bolton
E. A. Scott
INVENTOR
Willoughby Hamilton Power
BY
ATTORNEYS

UNITED STATES PATENT OFFICE.

WILLOUGHBY HAMILTON POWER, OF LONDON, ENGLAND.

DEVICE FOR PREVENTING WATER IN PIPES OR TANKS FROM FREEZING.

SPECIFICATION forming part of Letters Patent No. 580,800, dated April 13, 1897.

Application filed July 10, 1896. Serial No. 598,722. (No model.) Patented in England September 21, 1894, No. 17,998; in France July 18, 1895, No. 248,992, and in Belgium November 11, 1895, No. 118,310.

*To all whom it may concern:*

Be it known that I, WILLOUGHBY HAMILTON POWER, a subject of the Queen of Great Britain and Ireland, residing at 2 Pancras Lane, Queen Street, in the city of London, England, have invented certain new and useful Improvements in Devices for Preventing Water in Pipes or Tanks Being Frozen, of which the following is a specification.

The invention has been patented in England, No. 17,998, dated September 21, 1894; in France, No. 248,992, dated July 18, 1895, and in Belgium, No. 118,310, dated November 11, 1895.

The objects of my invention are devices for preventing water in pipes or tanks being frozen, and is especially adapted for use in connection with domestic and other internal services.

The invention consists in the water-heating chamber connected with the main pipe and provided with a detachable supplemental bottom having an asbestos filling with means for applying the heat.

Referring to the drawings, Figure 1 is an elevation of a vertical portion of the cold-water-supply pipe and horizontal portions of two branches from it, illustrating the construction of my invention and one mode of applying it to either vertical or horizontal pipes. Fig. 2 is a sectional elevation of my invention having the additional vessel already mentioned.

Referring to Fig. 1, *a* is a vertical portion of the cold-water supply. *b b* are portions of two horizontal branches. My object in selecting these two positions of pipe for illustration is to emphasize the fact that the present invention is quite independent of the direction of the pipe as well as of the fact that its applicability is not affected either by the position or the direction of the pipe which it is desired to safeguard against the inroad of frost. *c* is the closed vessel. The bottom *c'* of it is preferably dome-shaped, so as to expose an increased as well as a concave surface to the heat-rays from the heat-generator or source of heat *d*. Beyond this the shape of the vessel is a matter of indifference. The capacity of it should be in proportion to the volume of water to be safeguarded and its strength according to the maximum pressure obtaining in the service. As to the position of the vessel on the pipe—vertical or horizontal—the vessel should be at the distant end—as distinguished from the cistern end—of the pipe or of that portion of the pipe which it is intended to safeguard. For instance, in the case of a domestic service I regard it as of the first necessity that there should be one of my devices fixed on the kitchen-pipe close to the tap and preferably between it and the pipe to it.

The connection between the vessel and the respective pipe—main, branch, or special branch, as the case may be—is of any suitable kind. The expressions "main" and "branch" pipes are familiar. Besides that both kinds of pipe are illustrated in Fig. 1. By "special branch" I mean a short branch from any concealed part of the service provided solely to carry one of my devices and place it in communication with the said part.

The simplest form of connection is a short pipe from the vessel to the pipe to be safeguarded, but I prefer that there should be two connecting-pipes, as illustrated. One of these, *e*, extends from the bottom of the vessel *c* to the pipe *a* and is horizontal, because that is the shortest distance between the two. The other of them, *f*, is from the top of the said vessel to the pipe *a*, and is preferably oblique to facilitate the escape of air from the vessel *c*. In any case its direction must be such as will prevent the accumulation of air in it and is more efficient if it is upward rather than horizontal. The superiority of a two-pipe connection over one consisting of one only is due to the fact that through the former and the vessel *c* there will be a regular current from the junction of the pipe *e* with the pipe *a* to that of the pipe *f* with the pipe *a*, on the principle of the well-known hot-water circulation, while there would be no current to speak of through a single-pipe connection, or, at any rate, a very much less efficient one. Obviously the connecting-pipe *f'* from the top of the vessel *c* to the said branch should be vertical, for a vertical direction is under the circumstances the shortest and offers perfect security against the accumulation of air in either the vessel *c* or itself. The connecting-pipe $e'$ is oblique in an upward direction from the bottom of the vessel $c$ to the pipe $b$. The junctions of the connecting-pipes with the vessel $c$ and the pipe to be safeguarded are of any convenient kind.

The generator of heat may be of any suitable and efficient kind. Fig. 1 illustrates the use of lamps $d$, supported on wall-brackets $d'$, but the present invention does not limit me in this respect.

Referring to Fig. 2, $g$ is a cup detachably held by bayonet-joints $g'$ $g'$ to a flange $g^2$, depending from the sides of the vessel $c$. $h$ is the asbestos or equivalent heat-absorbing substance. $g^3$ is a central hole through the bottom of the cup for the heat from the flame of the heat-generator $d$ to pass through.

The above-mentioned cup may be extended into a jacket of a size to embrace the sides of the vessel $c$.

It is unnecessary to give here any directions as to the power of the heat-generator beyond this, that it is obvious that it must be capable of developing at the least as much heat as will keep the contents of the portion of the service allotted to it above freezing-point.

There are to be as many of my improved devices fitted to any given service as the size of it may require.

Having now described my invention, what I claim as new, and desire to secure by Letters Patent, is—

In combination with the main pipe, the water-chamber, the pipes leading therefrom to the main pipe, the supplemental bottom detachably connected to said chamber and having an asbestos filling and means for applying heat thereto, substantially as described.

In witness whereof I have hereunto set my hand in presence of two witnesses.

WILLOUGHBY HAMILTON POWER.

Witnesses:
CHAS. S. WOODROFFE,
ROBT. A. BLAKE.